(12) United States Patent
Bello et al.

(10) Patent No.: US 7,640,316 B2
(45) Date of Patent: Dec. 29, 2009

(54) APPARATUS AND METHOD TO WRITE INFORMATION TO TWO VIRTUAL TAPE SERVERS

(75) Inventors: Keith A. Bello, Oro Valley, AZ (US);
Dean L. Hanson, Tucson, AZ (US);
Gregory T. Kishi, Oro Valley, AZ (US);
Jonathan W. Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 10/656,993

(22) Filed: Sep. 5, 2003

(65) Prior Publication Data
US 2005/0066116 A1 Mar. 24, 2005

(51) Int. Cl.
*G06F 15/167* (2006.01)
(52) U.S. Cl. .................... 709/213; 709/214; 709/215; 709/216
(58) Field of Classification Search .......... 709/213–216
See application file for complete search history.

(56) References Cited

U.S. PATENT DOCUMENTS

| | | | | |
|---|---|---|---|---|
| 5,926,834 | A * | 7/1999 | Carlson et al. | 711/152 |
| 5,963,606 | A | 10/1999 | Drost et al. | 375/371 |
| 6,029,179 | A * | 2/2000 | Kishi | 707/202 |
| 6,263,465 | B1 | 7/2001 | Gehlot | 714/746 |
| 6,269,423 | B1 * | 7/2001 | Kishi | 711/113 |
| 6,292,834 | B1 * | 9/2001 | Ravi et al. | 709/233 |
| 6,304,880 | B1 * | 10/2001 | Kishi | 707/200 |
| 6,349,354 | B1 | 2/2002 | Garney | 710/127 |
| 6,374,336 | B1 * | 4/2002 | Peters et al. | 711/167 |
| 6,976,134 | B1 * | 12/2005 | Lolayekar et al. | 711/148 |
| 7,043,663 | B1 * | 5/2006 | Pittelkow et al. | 714/4 |
| 7,185,062 | B2 * | 2/2007 | Lolayekar et al. | 709/213 |
| 2001/0037371 | A1 * | 11/2001 | Ohran | 709/214 |

(Continued)

FOREIGN PATENT DOCUMENTS

JP            9186739 A            7/1997

(Continued)

OTHER PUBLICATIONS

International Business Machines Corporation, "z/OS V1R3 DFSMS Introduction", 1980, 2002, pp. 1-140.

(Continued)

*Primary Examiner*—Kenny S Lin
*Assistant Examiner*—Brian P Whipple
(74) *Attorney, Agent, or Firm*—Dale F. Regelman; Quarles & Brady LLP

(57) ABSTRACT

A method to write information to two virtual tape servers. The method writes a file to a virtual host device disposed in a first virtual tape server, where the virtual host device comprises an adjustable bandwidth. The method queues a job to copy the file to a second virtual tape server, determines the age of the copy job, and copies that file to the second virtual tape server. The method sets an age threshold, and determines if the copy job age is greater than that age threshold. If the copy job age is greater than the age threshold, then the method decreases the adjustable bandwidth, if not, the method restores the adjustable bandwidth.

15 Claims, 9 Drawing Sheets

U.S. PATENT DOCUMENTS

2002/0147774 A1* 10/2002 Lisiecki et al. .............. 709/203
2004/0044770 A1* 3/2004 Messick et al. ............. 709/226

FOREIGN PATENT DOCUMENTS

WO      WO0141338 A1    1/2007

OTHER PUBLICATIONS

Katabi, et al., "Congestion Control for High Bandwidth-Delay Product Networks," Aug. 19-23, 2002, pp. 89-102.
Aweya, et al., "An adaptive load balancing scheme for web servers," 2002, pp. 3-39.
International Business Machines, INSPEC, No. 7395254.
International Business Machines, INSPEC, No. 7005916.

* cited by examiner

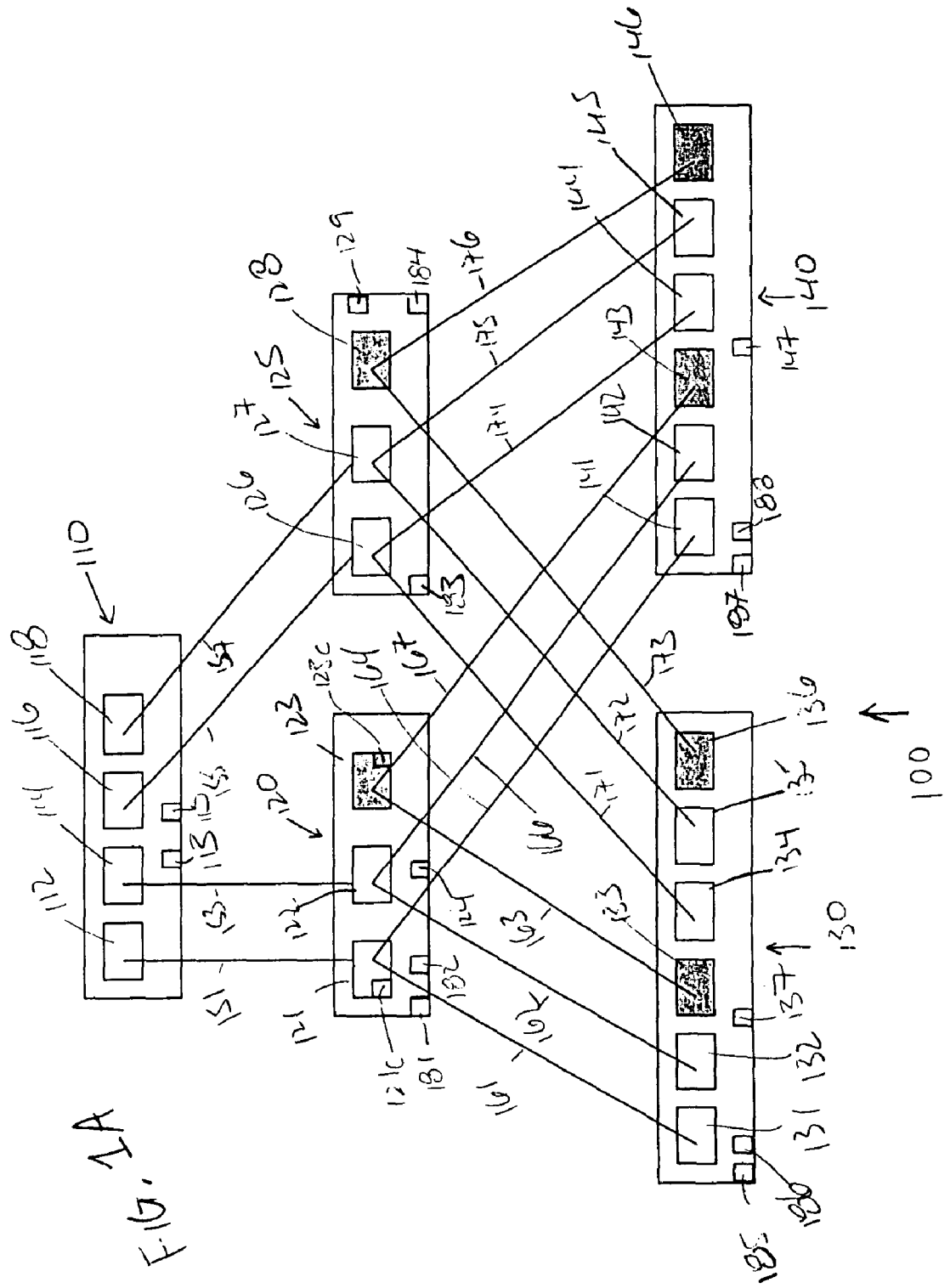

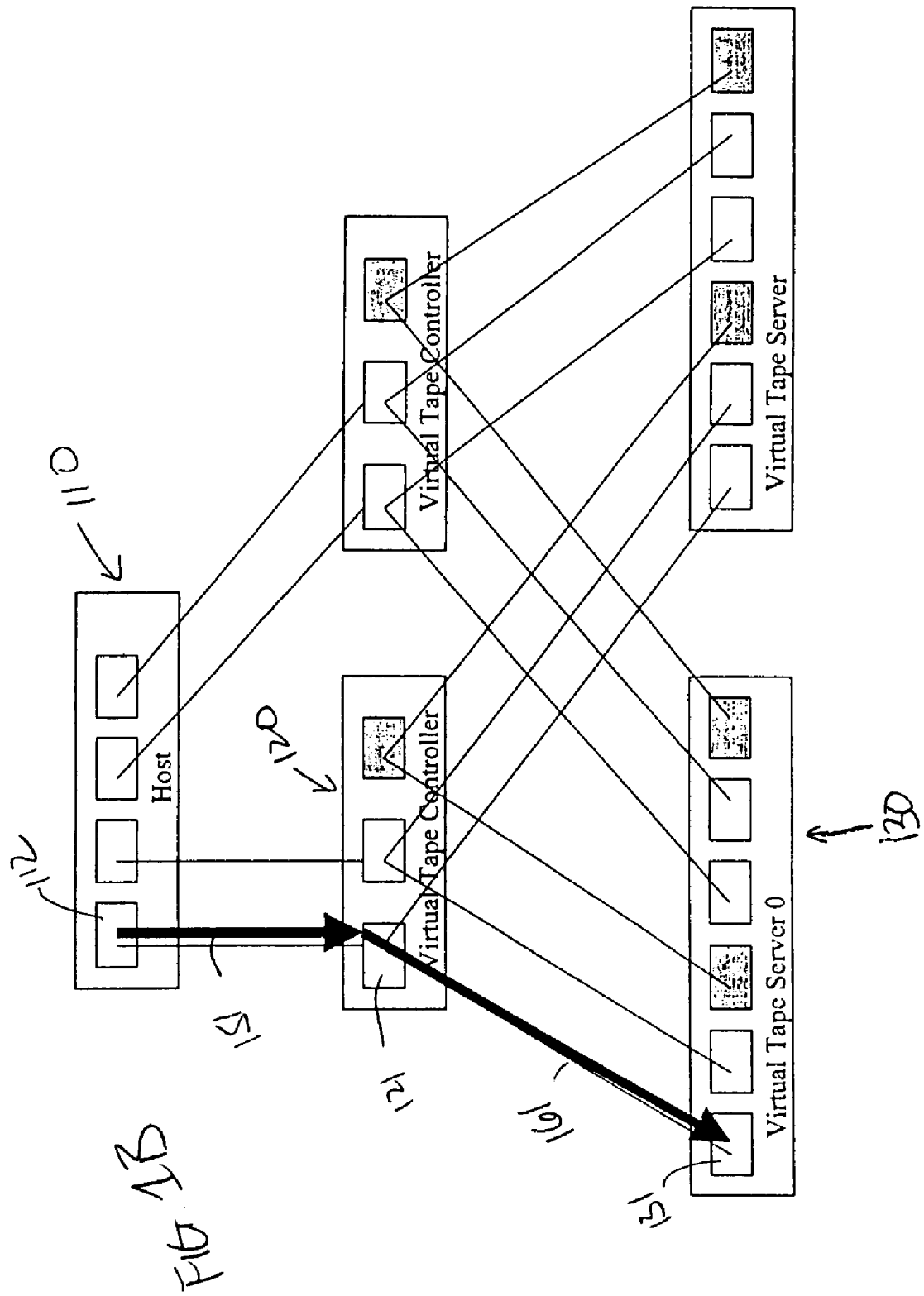

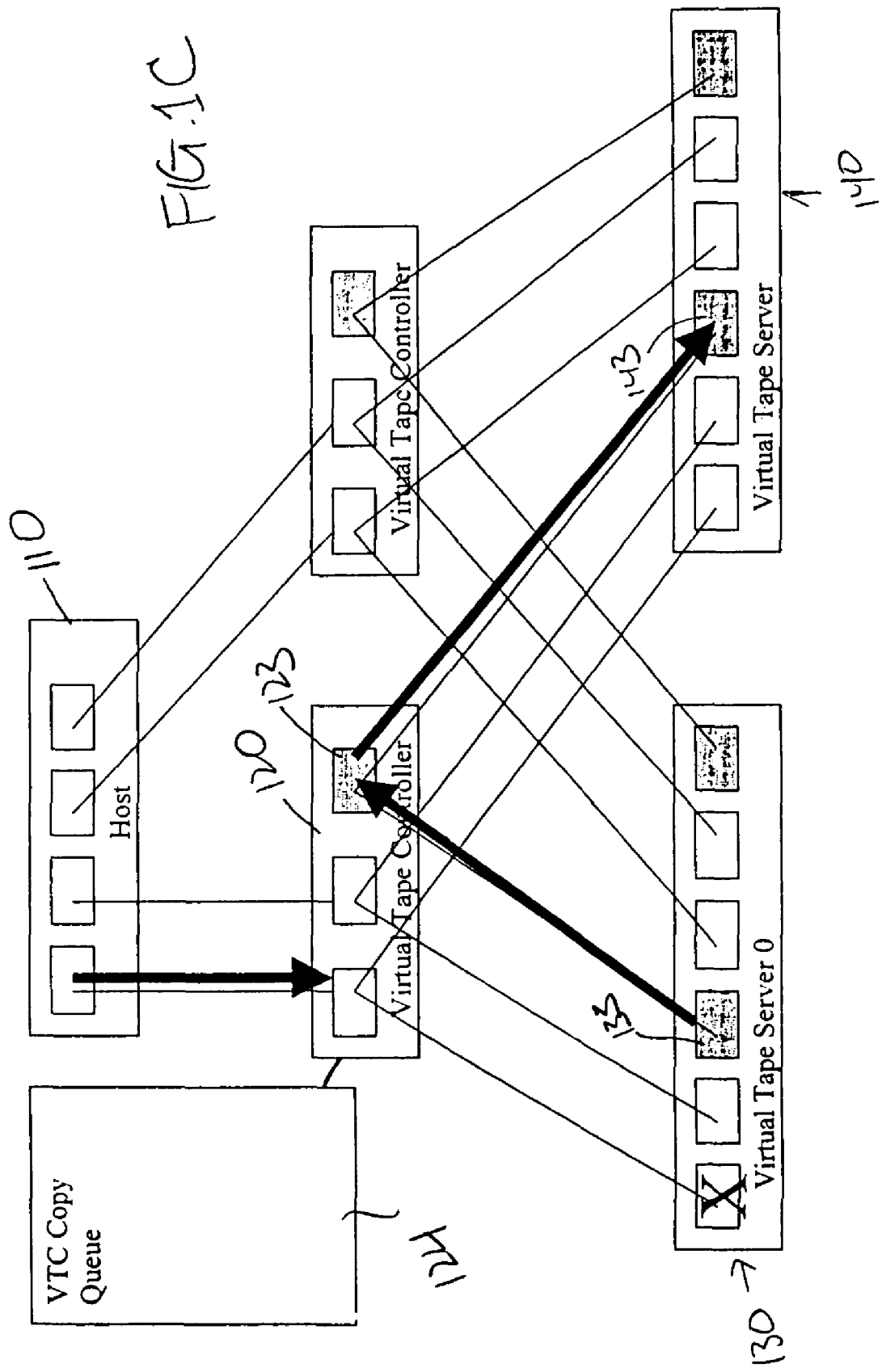

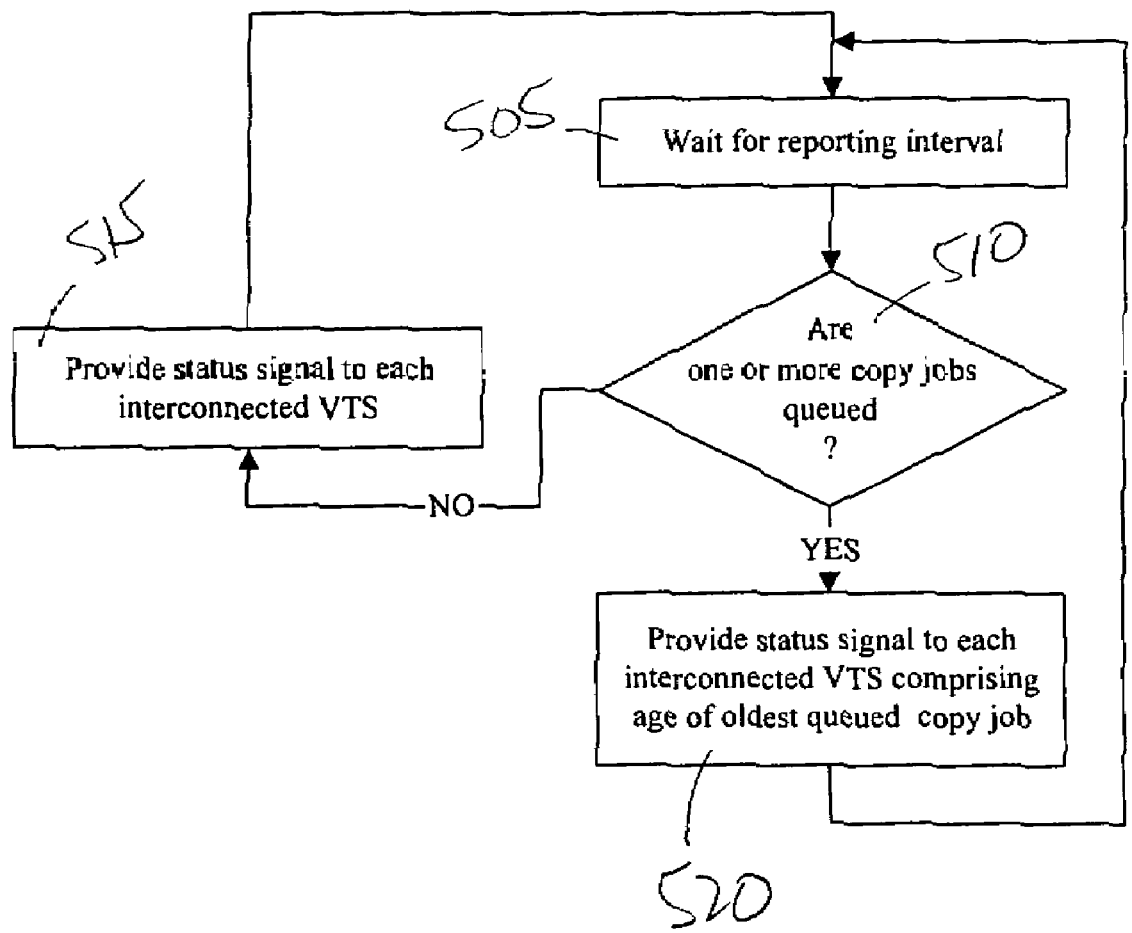

APPARATUS AND METHOD TO WRITE INFORMATION TO TWO VIRTUAL TAPE SERVERS

FIELD OF THE INVENTION

Applicant's invention relates to an apparatus and method to write information to two virtualtape servers.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, each virtual tape storage system is communicating data from one or more hosts via a VTS/host communication link, and is providing data to a second VTS for copying via a VTS/VTS communication link.

Data disaster recovery solutions include various "peer-to-peer" copy routines where data is backed-up not only remotely, but also continuously (either synchronously or asynchronously). In order to communicate duplexed data from one host processor to another host processor, or from one storage controller to another storage controller, or some combination thereof, a substantial amount of control data is required for realizing the process. A high overhead, however, can interfere with a secondary site's ability to keep up with a primary site's processing, thus threatening the ability of the secondary site to be able to recover the primary in the event a disaster occurs.

Disaster recovery protection for the typical data processing system requires that primary data stored on primary DASDs be backed-up at a secondary or remote location. The physical distance separating the primary and secondary locations can be set depending upon the level of risk acceptable to the user, and can vary from several kilometers to thousands of kilometers.

New files are received by two or more virtual tape servers from one or more host computers, where each of those virtual tape servers includes one or more virtual host devices having an aggregate VTS/host bandwidth. At the same time, other files are being copied from one VTS to a second VTS using a plurality of virtual copy devices having an aggregate VTS/VTS bandwidth. What is needed is a method to autonomically adjust the VTS/host bandwidth for each attached VTS to thereby adjust the aggregate VTS/VTS bandwidth.

SUMMARY OF THE INVENTION

Applicants' invention includes a method and apparatus to write information to two virtual tape servers, where a first virtual tape server comprises one or more first virtual host devices having a first adjustable aggregate bandwidth, and where that first virtual tape server provides information to, and receives information from, a second virtual tape server. Applicants' method writes a host computer file to a virtual host device disposed in the first virtual tape server.

The method queues a copy job, where that copy job comprises copying the host computer file to the second virtual tape server. The method then determines the age of the queued copy job. The method sets an age threshold, and determines if the age of the queued copy job is greater than that age threshold. If the age of the queued copy job is greater than the age threshold, then the method decreases the first adjustable aggregate bandwidth. Decreasing the first adjustable aggregate bandwidth makes additional bandwidth available to transmit files between the two virtual tape servers.

BRIEF DESCRIPTION OF THE DRAWINGS

The invention will be better understood from a reading of the following detailed description taken in conjunction with the drawings in which like reference designators are used to designate like elements, and in which:

FIG. 1A is a block diagram showing Applicants' data storage and retrieval system;

FIG. 1B illustrates writing a file from a host computer to one of the virtual tape servers of FIG. 1A;

FIG. 1C illustrates copying a file from one VTS to a second VTS;

FIG. 5A is a flow chart summarizing additional steps in Applicants' method;

DETAILED DESCRIPTION OF THE PREFERRED EMBODIMENTS

Figure 2:
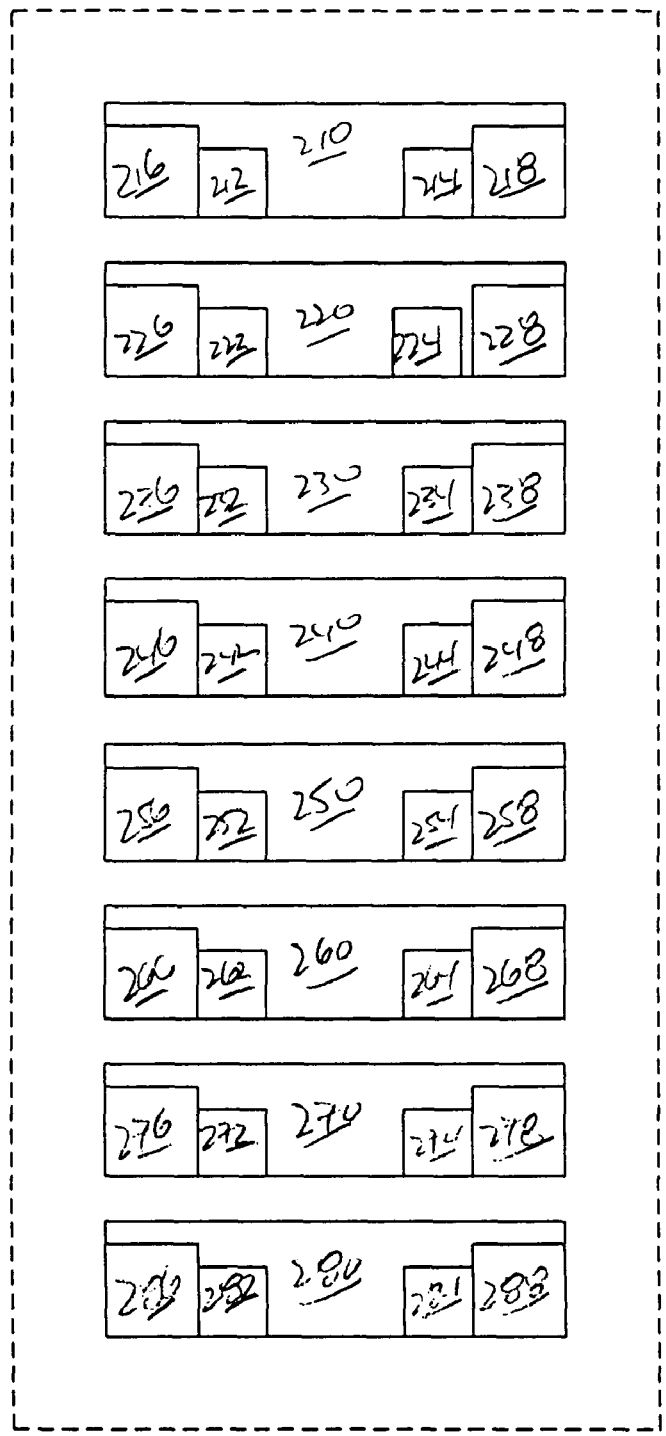
FIG. 2 is a block diagram showing the components comprising Applicants' virtual tape controller.

Referring now to FIG. 1A, Applicants' data storage and retrieval system 100 includes host computer 110, virtual tape controller 120, virtual tape controller 125, virtual tape server 130, and virtual tape server 140.

Host computer 110 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark of IBM Corporation, and MVS is a trademark of IBM Corporation; UNIX is a registered trademark in the United States and other countries licensed exclusively through The Open Group.) In certain embodiments, host computer 110 includes a storage management program 113. The storage management program 113 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 113 may include known storage management program functions, such as recall and migration. The storage management program 113 may be implemented within the operating system of the host computer or as a separate, installed application program. Alternatively, storage management program 113 may include device drivers, backup software, and the like.

Virtual tape controller 120 comprises a plurality of individual virtual devices, such as virtual devices 121, 122, and 123. Each of virtual devices 121, 122, and 123, is configured as either a virtual host device or a virtual copy device. Each of virtual devices 121, 122, and 123, comprises a memory and an adjustable bandwidth.

Virtual tape controller 125 comprises a plurality of individual virtual devices, such as virtual devices 126, 127, and 128. Each of virtual devices 126, 127, and 128, is configured as either a virtual host device or a virtual copy device. Each of virtual devices 126, 127, and 128, comprises a memory and an adjustable bandwidth.

Host computer 110 communicates with VTS 130 via host devices 112, 114, 116, and 118, disposed in host 110, virtual host devices 121 and 122 disposed in VTC 120, virtual host devices 126 and 127 disposed in VTC 125, and virtual host devices 131, 132, 134, and 135, disposed in VTS 130.

Host device 112 is interconnected with virtual host device 121 via communication link 151. Host device 114 is interconnected with virtual host device 122 via communication link 153. Host device 116 is interconnected with virtual host device 126 via communication link 155. Host device 118 is interconnected with virtual host device 127 via communication link 157.

In the illustrated embodiment of FIG. 1A, virtual tape server 130 includes virtual devices 131, 132, 133, 134, 135, and 136. Each of these virtual devices is configured as either a virtual host device, such as devices 131, 132, 134, and 135, or a virtual copy device, such as devices 133 and 136. Each of virtual devices 131, 132, 133, 134, 135, and 136, comprises a memory and an adjustable bandwidth.

Virtual host device 121 is interconnected with virtual host device 131 via communication link 161. Virtual host device 122 is interconnected with virtual host device 132 via communication link 162. Virtual host device 126 is interconnected with virtual host device 134 via communication link 171. Virtual host device 127 is interconnected with virtual host device 135 via communication link 172.

VTS 130 communicates with VTS 140 via virtual copy devices 123/133/143, and via virtual copy devices 128/136/146. Virtual copy device 123 is interconnected with virtual copy device 133 via communication link 163, and with virtual copy device 143 via communication link 167. Virtual copy device 128 is interconnected with virtual copy device 136 via communication link 173, and with virtual copy device 146 via communication link 176.

Virtual devices 131, 132, 133, 134, 135, and 136, each have an adjustable bandwidth. Virtual devices 131, 132, 133, 134, 135, and 136, in combination, comprise an adjustable, aggregate VTS bandwidth. This adjustable, aggregate bandwidth includes an adjustable host/VTS bandwidth and an adjustable VTS/VTS bandwidth. The adjustable host/VTS bandwidth for VTS 130 comprises the combined bandwidths for devices 131, 132, 134, and 135. The VTS/VTS bandwidth comprises the combined bandwidths for devices 133, 136, 143, and 146.

A VTS (such as VTS 130) has an inherent bandwidth limited by its internal components (for example CPU, memory, bus architecture and adapters). This bandwidth is shared by all the virtual devices on the VTS 130. Reducing the bandwidth allocated to one or more of virtual host devices 131, 132, 134, and/or 135, necessarily makes additional bandwidth available for copy devices 133 and/or 136. Increasing the bandwidth allocated to copy devices 133 and/or 136 increases the VTS/VTS bandwidth. Increasing the VTS/VTS bandwidth increases the rate at which files can be copied from VTS 130 to VTS 140 and vice versa.

Host computer 110 communicates with VTS 140 via host devices 112, 114, 116, and 118, disposed in host 110, virtual host devices 121 and 122 disposed in VTC 120, virtual host devices 126 and 127 disposed in VTC 125, and virtual host devices 141, 142, 144, and 145, disposed in VTS 140.

Host device 112 is interconnected with virtual host device 121 via communication link 151. Host device 114 is interconnected with virtual host device 122 via communication link 153. Host device 116 is interconnected with virtual host device 126 via communication link 155. Host device 118 is interconnected with virtual host device 127 via communication link 157.

In the illustrated embodiment of FIG. 1A, virtual tape server 140 includes virtual devices 141, 142, 143, 144, 145, and 146. Each of these virtual devices is configured as either a virtual host device, such as devices 141, 142, 144, and 145, or a virtual copy device, such as devices 143 and 146. Each of virtual devices 141, 142, 143, 144, 145, and 146, comprises a memory and an adjustable bandwidth.

Virtual host device 121 is interconnected with virtual host device 141 via communication link 164. Virtual host device 122 is interconnected with virtual host device 142 via communication link 166. Virtual host device 126 is interconnected with virtual host device 144 via communication link 174. Virtual host device 127 is interconnected with virtual host device 145 via communication link 175.

Virtual devices 141, 142, 143, 144, 145, and 146, in combination, comprise a total aggregate VTS bandwidth. This total aggregate bandwidth includes a host/VTS bandwidth and a VTS/VTS bandwidth. The host/VTS bandwidth for VTS 140 comprises the combined bandwidths for devices 141, 142, 144, and 145. The VTS/VTS bandwidth comprises the combined bandwidths for devices 133, 136, 143, and 146.

Reducing the bandwidth allocated to one or more of virtual host devices 141, 142, 144, and/or 145, necessarily makes additional bandwidth available for copy devices 143 and/or 146. Increasing the bandwidth allocated to copy devices 143 and/or 146 increases the VTS/VTS bandwidth. Increasing the VTS/VTS bandwidth increases the rate at which files can be copied from VTS 130 to VTS 140 and vice versa.

In the illustrated embodiment of FIG. 1A, virtual tape controller 120 includes three virtual devices, i.e. devices 121, 122, and 123. In certain embodiments, Applicants' virtual tape controller 120 includes up to about 35 virtual devices, where each of those 35 virtual devices are configured as either a virtual host device or as a virtual copy device.

Referring now to FIG. 2, virtual tape controller 200 illustrates eight virtual devices, namely devices 210, 220, 230, 240, 250, 260, 270, and 280. Each virtual device includes two I/O adapters, namely I/O adapters 212, 214, 222, 224, 232, 234, 242, 244, 252, 254, 262, 264, 272, 274, 282, and 284. Each virtual device includes a processor, such as processor 216, 226, 236, 246, 256, 266, 276, and 286.

Each virtual device includes one or more memory devices, such as memory 218, 228, 238, 248, 258, 268, 278, and 288. Memory devices 218, 228, 238, 248, 258, 268, 278, and 288, are each selected from the group consisting of RAM memory, one or more DASDs, one or more hard disks, one or more electronic storage devices, and combinations thereof. By electronic storage device, Applicants mean a device such as a PROM, EPROM, EEPROM, Flash PROM, compactflash, smartmedia, and the like.

Each of the eight devices disposed in virtual tape controller 200 is configured as either a virtual host device, or a virtual copy device. A virtual host device, such as for example device 121 (FIG. 1A), interconnects one or more host computers with a virtual tape server. A virtual copy controller, such as for example device 123, interconnects two virtual tape servers.

In certain embodiments, the VTC virtual devices do not contain their own adapters, processors, and/or memory. Instead, the VTC contains the adapters, processors and memory which are shared between the VTC virtual devices.

Figure 3:
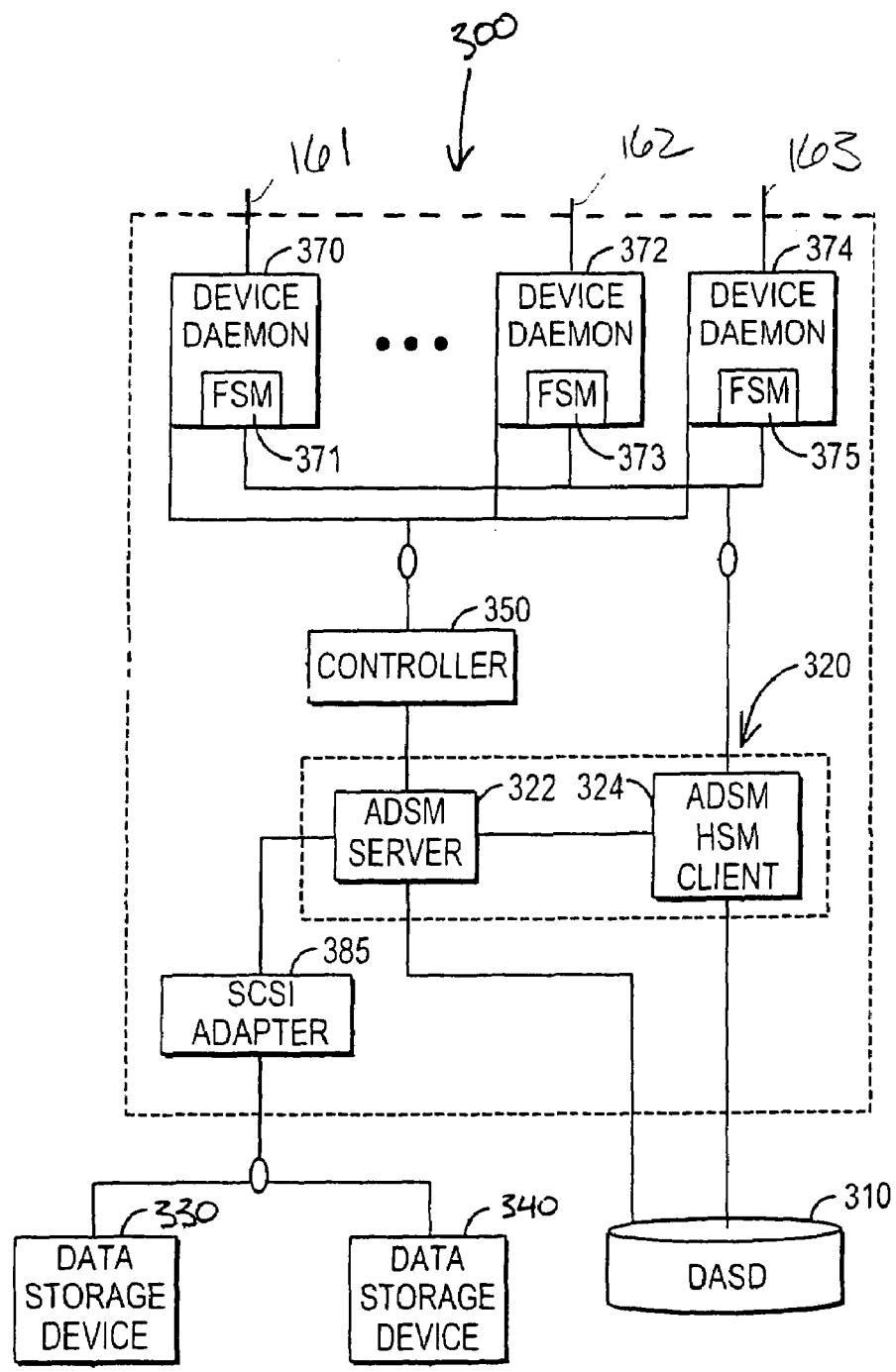
FIG. 3 is a block diagram showing the components of Applicants' virtual tape server.

Referring now to FIG. 3, virtual tape server 300 ("VTS") 300 communicates with one or more hosts and with one or more virtual tape controllers via daemons 370, 372, and 374. In the illustrated embodiment of FIGS. 1A and 3, daemon 370 comprises a virtual host device communicating with, for example, virtual host device 121 disposed in VTC 120 via communication link 161. In the illustrated embodiment of FIGS. 1A and 3, daemon 372 comprises a virtual host device communicating with, for example, virtual host device 122 disposed in VTC 120 via communication link 162. In the illustrated embodiment of FIGS. 1A and 3, daemon 374 comprises a virtual copy device communicating with virtual copy device 123 via communication link 163.

VTS 300 also communicates with direct access storage device (DASD) 310, and a plurality of data storage devices 330 and 340. In certain embodiments, data storage devices 330 and 340 are disposed within one or more data storage and retrieval systems. In certain embodiments, DASD 310 is integral with host 110 (FIG. 1). In certain embodiments, DASD 310 is integral with VTS 300. In certain embodiments, DASD 310 is integral with a data storage and retrieval system. In certain embodiments, DASD 310 is external to host 110, VTS 300, and the one or more data storage and retrieval systems in communication with VTS 300.

VTS 300 further includes storage manager 320, such as the IBM Adstar® Distributed Storage Manager. Storage manager 320 controls the movement of data from DASD 310 to information storage media mounted in data storage devices 330 and 340. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 330 and 340 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 330 and 340.

Referring now to FIG. 1B, host computer 110 writes information to VTC 120 using, for example, device 121. VTC 120 selects a corresponding device, such as device 131, disposed in VTS 130, and writes the information to that device. Information is transferred from host 110 to VTS 130 via devices 121 and 131 until the host indicates job completion by issuing a rewind/unload command. Referring now to FIG. 1C, VTC 120 queues a job to copy the information written to VTS 130 in VTC Copy Queue 124. Copy device 123 retrieves the oldest job in Copy Queue 124 and writes the corresponding data file to a copy device, such as copy device 143, disposed in VTS 140.

Figure 4:
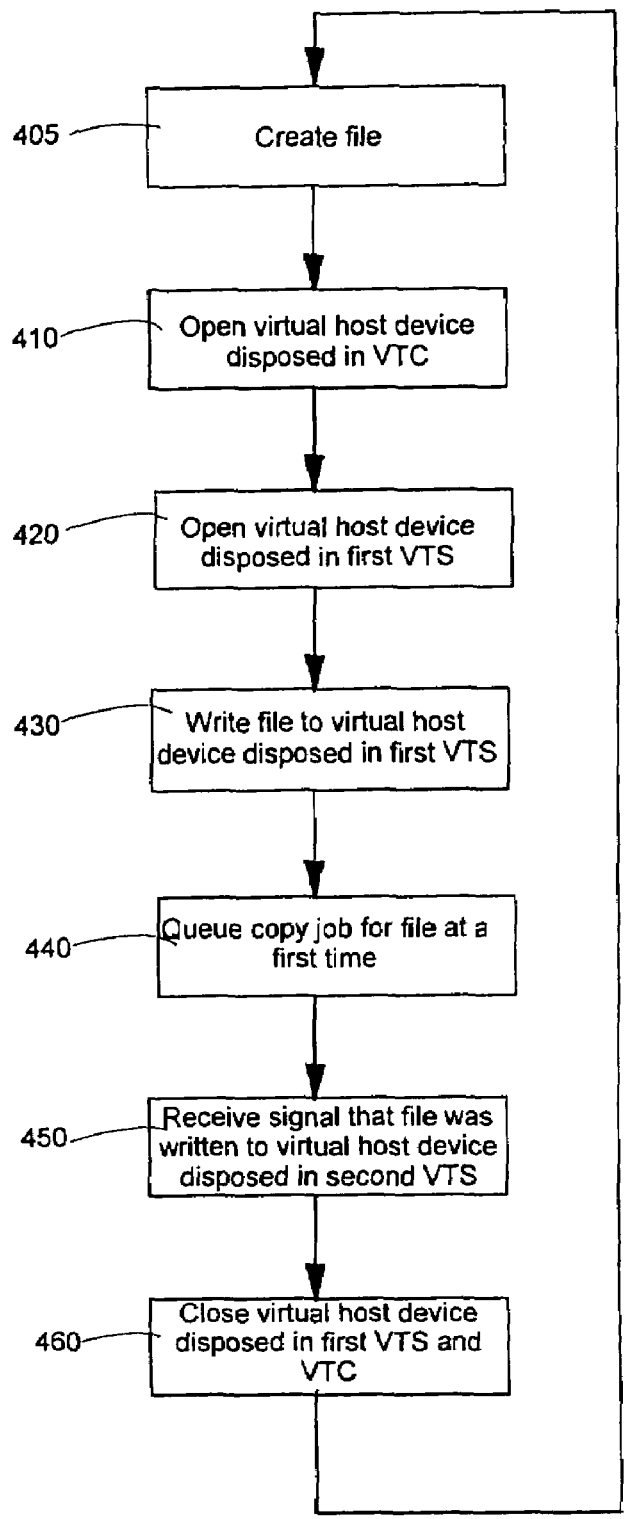
FIG. 4 is a flow chart summarizing the initial steps in Applicants' method.

Applicants' invention includes a method to write information to two virtual tape servers. FIG. 4 summarizes the steps of Applicants' method performed by a host computer and/or a virtual host device disposed in a virtual tape controller. Referring now to FIGS. 1A, 1B, 1C, and 4, in step 405 the method creates a file. The file of step 405 comprises information. In certain embodiments, the information of step 405 comprises one or more data packets or records. In certain embodiments, the information of step 405 comprises one or more logical volumes. In certain embodiments, the information of step 405 comprises all or portions of one or more database files. In certain embodiments, the information of step 405 comprises one or more updates for one or more database files. In certain embodiments, the information of step 405 comprises one or more log files, wherein those one or more log file comprise information relating to one or more database files. In certain embodiments, the information of step 405 comprises updates for one or more log files.

In certain embodiments, step 405 is performed by a host computer, such as host computer 110 (FIGS. 1A, 1B, 1C). In certain embodiments, step 405 is performed by an application running on a host computer, such as application 115 (FIG. 1A).

In step 410, Applicants' method opens a virtual host device disposed in a VTC, such as virtual host device 121 (FIGS. 1A, 1B) disposed in VTC 120 (FIGS. 1A, 1B, 1C). In certain embodiments, step 410 is performed by a host computer, such as host computer 110. In certain embodiments, step 410 is performed by an application running on a host computer, such as application 115.

In step 420, Applicants' method opens a virtual host device disposed in a first VTS, such as virtual host device 131 (FIGS. 1A, 1B) disposed in VTS 130 (FIGS. 1A, 1B, 1C). In certain embodiments, step 420 is performed by a host computer, such as host computer 110. In certain embodiments, step 420 is performed by a virtual tape controller, such as VTC 120. In certain embodiments, step 420 is performed by a virtual host device, such as virtual host device 121 (FIGS. 1A, 1B). In certain embodiments, step 420 is performed by a controller, such as controller 121c (FIG. 1A), disposed in a virtual host device, such as virtual host device 121.

In step 430, Applicants' method writes the file of step 405 to a virtual host device, such as virtual host device 131 disposed in a first VTS, such as VTS 130. In certain embodiments, step 430 is performed by first writing the file of step 405 to a virtual host device 121 disposed in VTC 120. In certain embodiments, step 430 is performed by the virtual tape controller, such as VTC 120. In certain embodiments, step 430 is performed by a virtual host device, such as virtual host device 121. In certain embodiments, step 430 is performed by a controller, such as controller 121c, disposed in a virtual host device, such as virtual host device 121.

In step 440, Applicants' method at a first time queues in a VTC Copy Queue, such as VTC Copy Queue 124 (FIG. 1C), a job to make a copy of the file of step 405 for transmission to a second VTS, such as VTS 140 (FIGS. 1A, 1C). In certain embodiments, step 440 is performed by the virtual tape controller, such as VTC 120. In certain embodiments, step 440 is performed by a virtual host device, such as virtual host device 121. In certain embodiments, step 440 is performed by a controller, such as controller 121c, disposed in a virtual host device, such as virtual host device 121.

In step 450, Applicants' method provides a signal that the file of step 405 has been written to the second VTS, such as VTS 140. In certain embodiments, step 450 is performed by a virtual host device, such as virtual host device 121. In certain embodiments, step 450 is performed by a virtual tape controller, such as VTC 120. In certain embodiments, step 450 is performed by a controller, such as controller 121c, disposed in a virtual host device, such as virtual host device 121. Applicants' method transitions from step 450 to step 460 wherein the method closes the virtual host devices of steps 410 and 420. In certain embodiments, step 460 is performed by the virtual tape controller, such as VTC 120. In certain embodiments, step 460 is performed by a virtual host device, such as virtual host device 121. In certain embodiments, step 460 is performed by a controller, such as controller 121c, disposed in a virtual host device, such as virtual host device 121. In certain embodiments, step 460 is performed by a host computer, such as host computer 110 (FIG. 1).

Figure 5B:
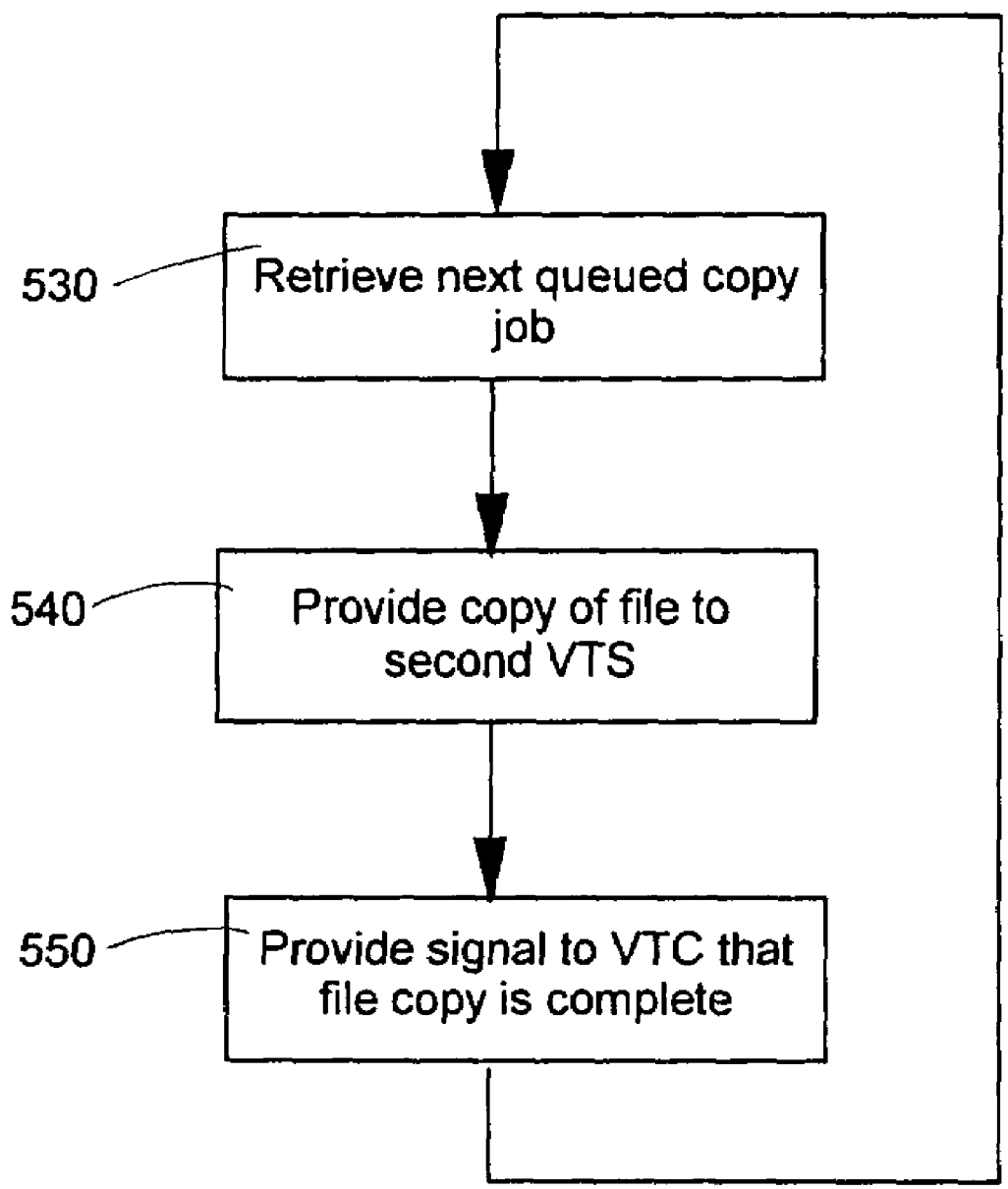
FIG. 5B is a flow chart summarizing additional steps in Applicants' method.
Figure 6:
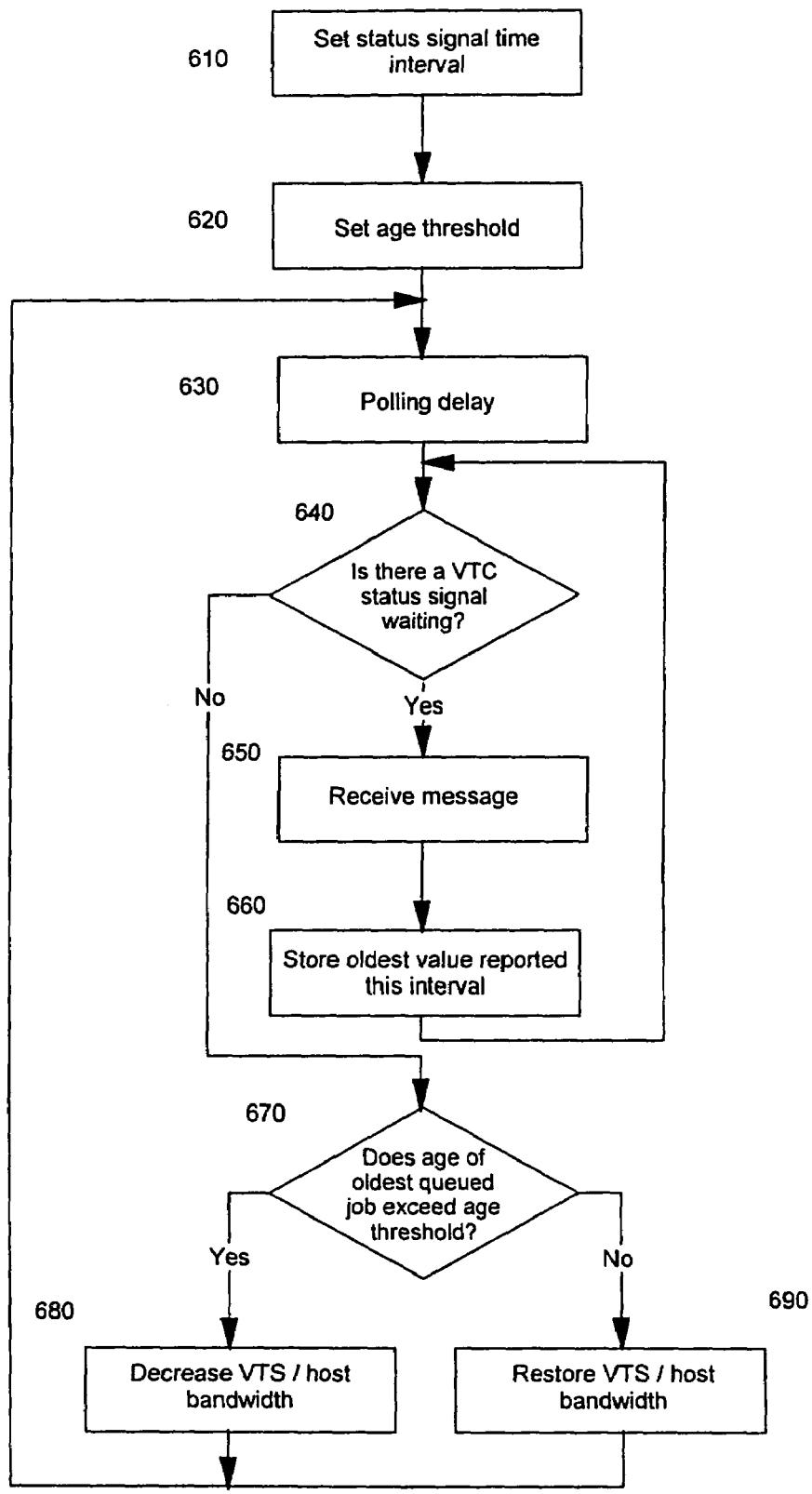
FIG. 6 is a flow chart summarizing additional steps in Applicants' method.

FIGS. 5A and 5B summarize certain steps of Applicants' method performed by a VTC, such as VTC 120 (FIGS. 1A, 1B, 1C). Referring now to FIG. 5A, in step 505, the VTC waits for the next status signal time interval set in step 610 (FIG. 6). At the next status signal time interval Applicantsp' method transitions from step 505 to 510 wherein the VTC determines if there are one or more copy jobs queued in the VTC Copy Queue, such as VTC Copy Queue 124 (FIG. 1C). In certain embodiments, step 510 is performed by a controller disposed in the VTC, such as controller 124 (FIG. 1A)/129 (FIG. 1A). In certain embodiments, step 510 is performed by a virtual host device, such as virtual host device 121 (FIGS. 1A, 1B). In certain embodiments, step 510 is performed by a controller, such as controller 121c (FIG. 1A), disposed in a virtual host device, such as virtual host device 121.

If Applicants' method determines in step 510 that no copy jobs are queued, then Applicants' method transitions from step 510 to step 515 wherein the method provides a status signal to each interconnected VTS, where that status signal comprises a timestamp. In certain embodiments, step 515 is performed by a virtual tape controller, such as VTC 120. In certain embodiments, step 515 is performed by a controller disposed in the VTC, such as controller 124 (FIG. 1A). In certain embodiments, step 515 is performed by a virtual host device, such as virtual host device 121. In certain embodiments, step 515 is performed by a controller, such as controller 121c, disposed in a virtual host device, such as virtual host device 121. Applicants' method transitions from step 515 to step 510 and continues.

If Applicants' method determines in step 510 that one or more copy jobs are queued, then the method transitions from step 510 to step 520 wherein the VTC provides a signal to each interconnected VTS, where that signal comprises a timestamp and the age of the oldest copy job queued. By "age," Applicants mean the length of time the copy job has been queued. In certain embodiments, step 520 is performed by a virtual tape controller, such as VTC 120. In certain embodiments, step 520 is performed by a controller disposed in the VTC, such as controller 124. In certain embodiments, step 520 is performed by a virtual host device, such as virtual host device 121. In certain embodiments, step 520 is performed by a controller, such as controller 121c, disposed in a virtual host device, such as virtual host device 121.

Referring now to FIG. 5B, in step 530, Applicants' method retrieves the oldest copy job queued from the VTC Copy Queue. In certain embodiments, step 530 is performed by a virtual tape controller, such as VTC 120. In certain embodiments, step 530 is performed by a controller disposed in the VTC, such as controller 124. In certain embodiments, step 530 is performed by a virtual copy device, such as virtual copy device 123 (FIGS. 1A, 1C) In certain embodiments, step 530 is performed by a controller, such as controller 123c (FIG. 1A), disposed in a virtual copy device, such as virtual copy device 123.

In step 540, the VTC writes the file corresponding to the copy job of step 530 to a virtual copy device, such as device 143 (FIGS. 1A, 1C), disposed in the second VTS, such as VTS 140 (FIGS. 1A, 1C). In certain embodiments, step 540 is performed by a virtual tape controller, such as VTC 120. In certain embodiments, step 540 is performed by a controller disposed in the VTC, such as controller 124 (FIG. 1A).In certain embodiments, step 540 is performed by a virtual copy device, such as virtual copy device 123. In certain embodiments, step 540 is performed by a controller, such as controller 123c, disposed in a virtual copy device, such as virtual copy device 123.

In step 550, the virtual copy device, such as copy device 123, receives a signal From the second VTS that the file has been written to a virtual copy device disposed in that VTS. In certain embodiments, step 550 is performed by controller disposed in the second VTS such as controller 147 (FIG. 1A). In certain embodiments, step 550 further includes providing a signal to the VTC that the file has been written to a copy device disposed in the second VTS. IN certain embodiments, the step of providing a signal to the VTC is performed by a virtual copy device, such as virtual copy device 123. In certain embodiments, the step of providing a signal to a VTC is performed by a controller, such as controller 123c, disposed in a virtual copy device, such as virtual host device 123. Applicants' method transitions from step 530 and continues.

Referring now to FIG. 6, in step 610 Applicants' method sets a status signal time interval. Each VTC periodically provides a status signal to each interconnected VTS. Those status signals are provided at the status signal interval of step 610.

In certain embodiments, the status signal time interval of step 610 is set in firmware disposed in a memory, such as memory 218 (FIG. 2), disposed in a virtual device, such as virtual device 210 (FIG.2). In certain embodiments, the status signal time interval is provided by a host computer, such as host computer 110 (FIGS. 1A, 1B, 1C)). In certain embodiments, the status time interval of step 610 is set in firmware disposed in a controller, such as controller 137 (FIG. 1A), disposed in a VTS, such as VTS 130. In certain embodiments, the status signal time interval of step 610 is set in firmware disposed in a controller, such as controller 124 (FIG. 1A), disposed in a VTS, such as VTC 120 (FIGS. 1A, 1B, 1C).

In step 620, Applicants' method sets an age threshold. The age threshold of step 620 comprises the maximum acceptable file age before completing the copy. In certain embodiments, the age threshold of step 620 is set in firmware disposed in a memory, such as memory 218, disposed in a virtual device, such as virtual device 210. In certain embodiments, the age threshold of step 620 is provided by a host computer, such as host computer 110. In certain embodiments, the age threshold of step 620 is set in firmware disposed in a controller, such as controller 137, disposed in a VTS, such as VTS 130. In certain embodiments, the age threshold of step 620 is set in firmware disposed in a controller, such as controller 124, disposed in a VTC, such as VTC 120.

In step 630, each VTS determines if it is time to check incoming signals. Each VTS checks incoming signals at a regular polling interval, such as for example every minute. In certain embodiments, the polling interval of step 630 is provided by a host computer, such as host computer 110 (FIG. 1). In certain embodiments, the polling interval of step 630 is set in firmware disposed in a controller, such as controller 137, disposed in a VTS, such as VTS 130.

In step 640, each VTS in the system determines if a VTC status signal is waiting. In certain embodiments, step 640 is performed by a controller disposed in a VTS, such as controller 137 (FIG. 1A)/147 (FIG. 1A). If Applicants' method determines in step 640 that a VTC message is waiting, then Applicants' method transitions from step 640 to step 650 wherein each VTS receives that VTC status signal. In certain embodiments, step 650 is performed by a controller disposed in a VTS, such as controller 137/147.

Applicants' method transitions from step 650 to step 660 wherein each VTS stores the oldest age value reported in the VTC message of step 650. In certain embodiments, step 660 is performed by a controller disposed in a VTS, such as controller 137/147. Applicants' method transitions from step 660 to step 640 and continues.

If Applicants' method determines in step 640 that a VTC status signal is not waiting, then the method transitions from step 640 to step 670 wherein each VTS independently determines if the age of oldest copy job queued exceeds the age threshold of step 620. If Applicants' method determines in step 670 that the age of the oldest copy job queued does not exceed the age threshold of step 620, then the method transitions from step 670 to step 690 wherein the VTS restores its VTS/host bandwidth to a pre-determined nominal value.

If a VTS determines in step 670 that the age of a copy job queued exceeds the age threshold of step 620, then Applicants' method transitions from step 670 to step 680 wherein the VTS decreases its VTS/host bandwidth.

A VTS, such as VTS 130/140, has an inherent bandwidth limited by its internal components, including for example CPU, memory, bus architecture and adapters. This bandwidth is shared by all the virtual devices on the VTS. Reducing the bandwidth allocated to one or more of virtual host devices, such as for example virtual host device 132, necessarily makes additional bandwidth available for copy device 133. Increasing the bandwidth allocated to copy device 133 increases the VTS/VTS bandwidth. Increasing the VTS/VTS bandwidth increases VTC throughput, i.e. the rate at which files can be copied from VTS 130 to VTS 140 and vice versa.

In certain embodiments, VTS 130 (FIG. 1) receives first files from one or more host computers and queues jobs for those first files to be copied by VTS 140 (FIG. 1), while simultaneously VTS 140 receives second files from one or more host computer and queues jobs for those second files to be copied by VTS 130. In these embodiments, a controller in VTS 130 autonomically adjusts the VTS 130/host bandwidth while a controller in VTS 140 autonomically adjusts the VTS 140/host bandwidth. In these 10 embodiments, Applicants' method simultaneously autonomically adjusts the VTS/host bandwidths for both virtual tape servers using the steps recited in FIGS. 4, 5A, 5B, and 6.

In certain embodiments, individual steps recited in FIGS. 4, 5A, 5B, and/or 6, may be implemented separately. In certain embodiments, individual steps recited in FIGS. 4, 5A, 5B, and/or 6, may be combined, eliminated, or reordered.

Applicants' invention further includes an article of manufacture comprising a computer useable medium, such as computer useable media 181 (FIG. 1A), and/or 183 (FIG. 1A), and/or 185 (FIG. 1A), and/or 187 (FIG. 1A), having computer readable program code disposed therein method to write information to two information storage media by implementing some or all of the steps recited in FIGS. 4, 5A, 5B, and/or 6.

Applicants' invention further includes a computer program product, such as for example computer program product 182 (FIG. 1A), and/or 184 (FIG. 1A), and/or 186 (FIG. 1A), and/or 188 (FIG. 1A), usable with a programmable computer processor having computer readable program code embodied therein method to write information to two information storage media by implementing some or all of the steps of FIGS. 4, 5A, 5B, and/or 6.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to write information to two virtual tape servers, comprising the steps of:

supplying a data storage and retrieval system comprising a host computer, a first virtual tape controller ("VTC") comprising a VTC Copy Queue, a second virtual tape controller, a first virtual tape server ("VTS"), and a second virtual tape server, wherein said first virtual tape controller comprises a first virtual host device and a first virtual copy device, and wherein said second virtual tape controller comprises a second virtual host device and a second virtual copy device, and wherein said first virtual tape server comprises a third virtual host device and a third virtual copy device, and wherein said second virtual tape server comprises a fourth virtual host device and a fourth virtual copy device, wherein said host computer communicates with said first virtual tape server using a host/VTS bandwidth, wherein said host computer communicates with said second virtual tape server via said second virtual host device and said fourth virtual host device, and wherein said first virtual tape server communicates with said second virtual tape server using a VTS/VTS bandwidth;

writing a host computer file to said second virtual host device disposed in said first virtual tape server;

queuing a copy job in said VTC Copy Queue, wherein said copy job comprises copying said host computer file to said second virtual tape server;

determining an age of said queued copy job;

setting an age threshold;

determining if the age of said queued copy job is greater than said age threshold;

operative if the age of said queued copy job is greater than said age threshold, decreasing said host/VTS bandwidth and increasing said VTS/VTS bandwidth.

2. The method of claim 1, further comprising the step of operative if the age of said queued copy job is not greater than said age threshold, restoring said host/VTS bandwidth to a pre-determined nominal value.

3. The method of claim 1, wherein said second virtual tape server comprises one or more virtual host devices having a second adjustable aggregate bandwidth further comprising the step of operative if the age of said queued copy job is greater than said age threshold, decreasing said second adjustable aggregate bandwidth.

4. The method of claim 3, further comprising the step of operative if the age of said queued copy job is not greater than said age threshold, restoring said second adjustable aggregate bandwidth to a pre-determined nominal value.

5. The method of claim 1, further comprising the steps of:
retrieving by said virtual copy controller said copy job from said copy queue;
writing said host computer file to a virtual copy device disposed in said second virtual tape server.

6. The method of claim 5, further comprising the steps of:
setting a status signal time interval;
providing a status signal from said virtual tape controller to said first virtual tape server and to said second virtual tape server at said status signal time interval.

7. The method of claim 3, further comprising the steps of:
queuing a plurality of copy jobs in said copy queue;
determining the age for each of said queued copy jobs;
providing a status signal comprising the age of the oldest queued copy job;
determining if the age of the oldest queued copy job exceeds said age threshold;
operative if the age of the oldest queued copy job is greater than said age threshold, decreasing said host/VTS bandwidth and said second adjustable aggregate bandwidth;

operative if the age of the oldest queued copy job is not greater than said age threshold, restoring said host/VTS bandwidth and said second adjustable aggregate bandwidth to a pre-determined nominal value.

8. A first virtual tape server ("VTS") comprising one or more virtual devices having an adjustable aggregate bandwidth, and a computer readable medium having computer readable program code disposed therein to write information to two virtual tape servers, wherein said article of manufacture is disposed in a data storage and retrieval system comprising a host computer, a first virtual tape controller ("VTC") comprising a VTC Copy Queue, a second virtual tape controller, said first virtual tape server, and a second virtual tape server, wherein said first virtual tape controller comprises a first virtual host device and a first virtual copy device, and wherein said second virtual tape controller comprises a second virtual host device and a second virtual copy device, and wherein said first virtual tape server comprises a third virtual host device and a third virtual copy device, and wherein said second virtual tape server comprises a fourth virtual host device and a fourth virtual copy device, wherein said host computer communicates with said first virtual tape server via said first virtual host device and said third virtual host device using a host / VTS bandwidth, wherein said host computer communicates with said second virtual tape server via said second virtual host device and said fourth virtual host device, and wherein said first virtual tape server communicates with said second virtual tape server via said first virtual copy device, said second virtual copy device, and said fourth virtual copy device, using a VTS/VTS bandwidth, the computer readable program code comprising a series of computer readable program steps to effect:

receiving a host computer file via said second virtual host device;

receiving a signal from said first virtual tape controller, wherein said signal comprises the age of a copy job queued in said virtual tape controller, wherein said copy job comprises copying said host computer file to said second virtual tape server;

retrieving a pre-determined age threshold;

determining if said age of said queued copy job is greater than said age threshold;

operative if said age of said queued copy job is greater than said age threshold, decreasing said host/VTS bandwidth and increasing said VTS/VTS bandwidth.

9. The first virtual tape server of claim 8, said computer readable program code further comprising a series of computer readable program steps to effect restoring said host/VTS bandwidth to a pre-determined nominal value if said age of said queued copy job is not greater than said age threshold.

10. The first virtual tape server of claim 8, said computer readable program code further comprising a series of computer readable program steps to effect providing said host computer file to said second virtual tape server.

11. The first virtual tape server of claim 10, said computer readable program code further comprising a series of computer readable program steps to effect receiving a signal from said virtual tape controller that said host computer file was written to said second virtual tape server.

12. The first virtual tape server of claim 8, said computer readable program code further comprising a series of computer readable program steps to effect:

receiving a status signal from said first virtual tape controller, wherein said status signal comprises a timestamp and the age of the oldest queued copy job at said timestamp.

13. A data storage and retrieval system, comprising a host computer, a first virtual tape controller ("VTC") comprising a VTC Copy Queue, a second virtual tape controller, a first virtual tape server ("VTS") comprising a first adjustable aggregate bandwidth, and a second virtual tape server, wherein said first virtual tape controller comprises a first virtual host device and a first virtual copy device, and wherein said second virtual tape controller comprises a second virtual host device and a second virtual copy device, and wherein said first virtual tape server comprises a third virtual host device and a third virtual copy device, and wherein said second virtual tape server comprises a fourth virtual host device and a fourth virtual copy device, wherein said host computer communicates with said first virtual tape server via said first virtual host device and said third virtual host device using a host/VTS bandwidth, wherein said host computer communicates with said second virtual tape server via said second virtual host device and said fourth virtual host device, and wherein said first virtual tape server communicates with said second virtual tape server via said first virtual copy device, said second virtual copy device, and said fourth virtual copy device, and wherein said first virtual tape server provides information to, and receives information from said second virtual tape server using a VTS/VTS bandwidth, using the following steps:

receiving a host computer file via said second virtual host device;

receiving a signal from said first virtual tape controller, wherein said signal comprises the age of a copy job queued in said virtual tape controller, wherein said copy job comprises copying said host computer file to said second virtual tape server;

retrieving a pre-determined age threshold;

determining if the age of said queued copy job is greater than said age threshold;

operative if the age of said queued copy job is greater than said age threshold, decreasing said host/VTS bandwidth and increasing said VTS/VTS bandwidth.

14. The data storage and retrieval system of claim 13, wherein said virtual copy controller provides information to said second virtual tape server using the steps of:

providing said host computer file to said second virtual tape server.

15. The data storage and retrieval system of claim 14, wherein said second virtual tape server comprises one or more second virtual host devices having a second adjustable aggregate bandwidth, wherein said second virtual tape server communicates with said one or more host computers using said one or more second virtual host devices, wherein said second virtual tape server receives information from said first virtual tape server using the steps of:

operative if the age of said queued copy job is greater than said age threshold, decreasing said second adjustable aggregate bandwidth; and operative if the age of said queued copy job is not greater than said age threshold, restoring said second adjustable aggregate bandwidth to a pre-determined nominal value.

\* \* \* \* \*